United States Patent
Ruiz Alvés et al.

(10) Patent No.: US 12,028,133 B2
(45) Date of Patent: Jul. 2, 2024

(54) SWAPPED SECTION DETECTION AND AZIMUTH PREDICTION

(71) Applicant: Telefonaktiebolaget LM Ericsson (publ), Stockholm (SE)

(72) Inventors: José María Ruiz Alvés, Málaga (ES); Juan Ramiro Moreno, Malaga (ES); Adriano Mendo Mateo, Malaga (ES); Jose Outes Carnero, Torremolinos (ES); Paulo Antonio Moreira Mijares, Malaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 17/786,493

(22) PCT Filed: Apr. 14, 2020

(86) PCT No.: PCT/IB2020/053518
§ 371 (c)(1),
(2) Date: Jun. 16, 2022

(87) PCT Pub. No.: WO2021/123923
PCT Pub. Date: Jun. 24, 2021

(65) Prior Publication Data
US 2023/0036577 A1      Feb. 2, 2023

(30) Foreign Application Priority Data

Dec. 20, 2019   (EP) .................................... 19383165

(51) Int. Cl.
*H04B 7/0491*   (2017.01)
*H04B 7/06*   (2006.01)
(Continued)

(52) U.S. Cl.
CPC ......... *H04B 7/0491* (2013.01); *H04B 7/0626* (2013.01); *H04B 7/18554* (2013.01); *H04B 17/318* (2015.01)

(58) Field of Classification Search
CPC .... H04B 17/17; H04B 17/318; H04B 7/0491; H04B 7/0626; H04B 7/18554; H04W 24/04; H04W 24/08; G01S 3/40
See application file for complete search history.

(56) References Cited

U.S. PATENT DOCUMENTS 10,082,556 B1    9/2018   Hopcraft et al.
10,084,673 B1 *  9/2018   Sirure ................... H04W 24/08
(Continued)

FOREIGN PATENT DOCUMENTS

CN    106358213 A  *  1/2017  ............ H04W 16/20
CN    108375363 A       8/2018
(Continued)

OTHER PUBLICATIONS

Kaddoura, Omar, et al., "Swapped Sectors Detection Based on Mobility Statistics", IEEE Commun. Lett., vol. 22, May 2018, 1038-1041.

(Continued)

*Primary Examiner* — Sophia Vlahos
(74) *Attorney, Agent, or Firm* — Murphy, Bilak & Homiller, PLLC

(57) ABSTRACT

A method for detecting swapped antenna sectors in a cellular communications network. For each of one or more cells in the cellular communications network, an azimuth is estimated for each of two or more antenna sectors in the cell using a plurality of geo-located signal measurements for each antenna sector and a machine-learning algorithm. The estimated azimuths are compared to azimuths associated with the corresponding antenna sectors in a stored repre- (Continued)

sentation of the cellular communications network, to detect swapped antenna sectors in the cell.

19 Claims, 6 Drawing Sheets

(51) Int. Cl.
*H04B 7/185* (2006.01)
*H04B 17/318* (2015.01)

(56) References Cited

U.S. PATENT DOCUMENTS

| | | | | |
|---|---|---|---|---|
| 2012/0113837 | A1* | 5/2012 | Siomina | H04W 24/10 |
| | | | | 370/252 |
| 2013/0115939 | A1 | 5/2013 | Guo et al. | |
| 2013/0273921 | A1* | 10/2013 | Kenington | H04W 16/18 |
| | | | | 455/446 |
| 2013/0324110 | A1* | 12/2013 | Kenington | H04W 36/00835 |
| | | | | 455/423 |
| 2017/0150383 | A1* | 5/2017 | Driusso | G01S 11/08 |
| 2019/0014488 | A1* | 1/2019 | Tan | G06N 3/044 |
| 2020/0008078 | A1* | 1/2020 | Andersson | H04B 7/0413 |
| 2020/0096596 | A1* | 3/2020 | An | G01S 3/72 |

FOREIGN PATENT DOCUMENTS

| | | | | |
|---|---|---|---|---|
| CN | 110430578 | A * | 11/2019 | H04W 16/18 |
| CN | 110536310 | A | 12/2019 | |
| CN | 111372183 | A * | 7/2020 | H04W 24/08 |
| WO | 2016154327 | A1 | 9/2016 | |

OTHER PUBLICATIONS

Kaddoura, Omar, et al., "Swapped Sectors Detection Based on User Location During Inter-Site Handovers", IEEE Access, vol. 7, Jul. 26, 2019, 92547-92560.

Kaddoura, Omar, et al., "Swapped Sectors Detection on Multi-Layer Networks", IEEE Commun. Lett., vol. 22, No. 11, Nov. 2018, 2342-2345.

Shaikh, Naveed, "Sector SWAP Identification Guide", LCC, Feb. 2018, 1-10.

* cited by examiner

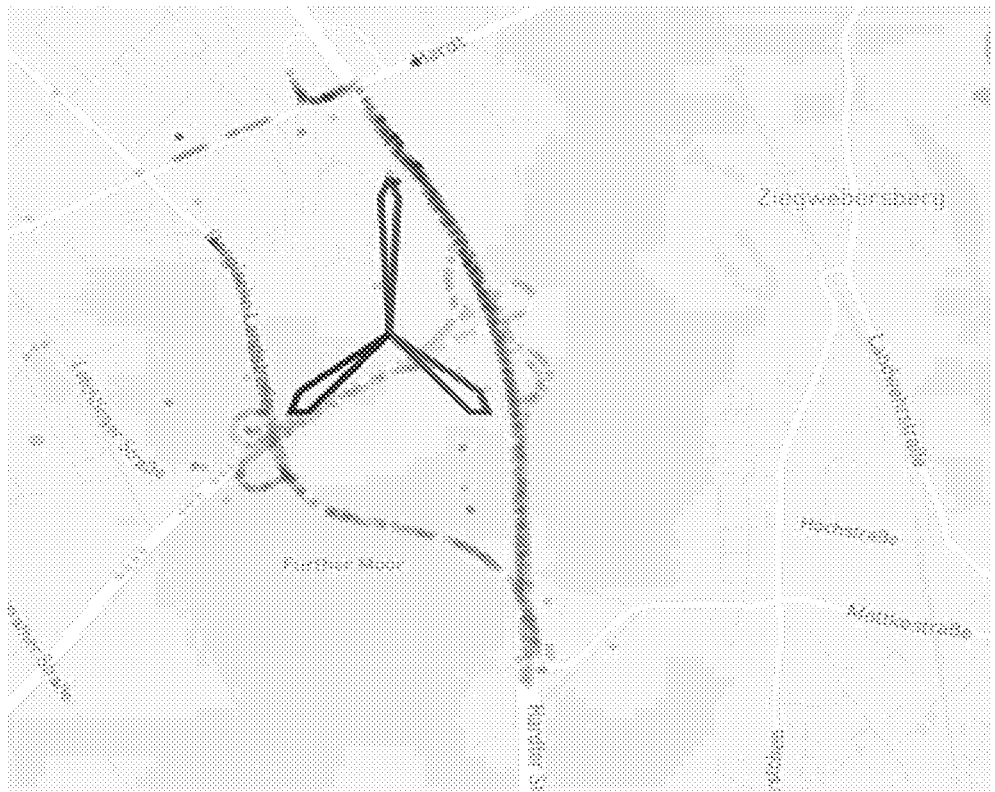

Fig. 4

| Site | Distance | Cells Original Setup | Cells Proposed Setup after swap | First Improvement |
|---|---|---|---|---|
| BXL790 | 6300 | [ LD10684A LD10684B ] | [ LD10684B LD10684A ] | 128.55592 |
| BXLA64 | 2850 | [ LD17519K LD17519M ] | [ LD17519M LD17519K ] | 127.17426 |
| BXLB32 | 101 | [ LD11546B LD11546C ] | [ LD11546C LD11546B ] | 119.94586 |
| BXLR73 | 1801 | [ LD18439K LD18439L ] | [ LD18439L LD18439K ] | 118.32091 |
| BXLR73 | 6300 | [ LD10106A LD10106B ] | [ LD10106B LD10106A ] | 114.923 |
| BXLR98 | 6300 | [ LD10106S LD10106T ] | [ LD10106T LD10106S ] | 113.0909 |
| DXLA25 | 6300 | [ LD27020L LD27020M ] | [ LD27020M LD27020L ] | 110.21687 |
| DXLI52 | 2850 | [ LD10706S LD10706U ] | [ LD10706U LD10706S ] | 110.1165246 |
| DXLI52 | 6300 | [ LD10072H LD10072I ] | [ LD10072I LD10072H ] | 103.59915 |
| DXLN21 | 6300 | [ LD10684S LD10684T LD10684U ] | [ LD10684T LD10684S LD10684U ] | 103.0424667 |
| DXLZ14 | 101 | [ LD10382S LD10382U ] | [ LD10382U LD10382S ] | 102.74607 |
| FXLD08 | 6300 | [ LD10162A LD10162C ] | [ LD10162C LD10162A ] | 102.24242 |
| FXLG92 | 6300 | [ LUE7412K LUE7412L ] | [ LUE7412L LUE7412K ] | 100 |
| FXLH05 | 6300 | [ LD11940M LD11940N ] | [ LD11940N LD11940M ] | 100 |
| HXLF68 | 6300 | [ LD10926S LD10926T LD10926U LD10926V] | [ LD10926V LD10926U LD10926T LD10926S] | 99.7179315 |
| HXLT53 | 6300 | [ LDE1337L LDE1337M ] | [ LDE1337M LDE1337L ] | 96.58084 |
| HXLY86 | 6300 | [ LUEL913L LUEL913N ] | [ LUEL913N LUEL913L ] | 95.42462 |

Fig. 5

(a) Real vs Predicted Azimuth distribution.

(b) Azimuth prediction error

SWAPPED SECTION DETECTION AND AZIMUTH PREDICTION

TECHNICAL FIELD

The present disclosure is generally directed to the roll-out and maintenance of cellular communications networks and is more particularly directed to techniques for estimating azimuths for antenna sectors in such a network, for detecting swapped antenna sectors in a cell.

BACKGROUND

When cellular network equipment is installed in the field, e.g., during rollout of a new network technology, one of the most common faults that appears is the swapped antenna sector or, more simply, the swapped sector. This problem is common among different technologies (e.g., 2G, 3G, 4G, and 5G cellular network technology), and occurs when, during network equipment installation, feeds from different antenna sectors are crossed.

For a given cell, swapped sectors happen between two or more sectors. The consequence of swapped sectors is that the coverage areas of the respective sectors is swapped, with respect to what is expected. If the swapped sectors have similar physical characteristics, there may be no significant loss in coverage area, but other network planning and operational issues may arise from the swapped connections. For instance:

Planning and optimization processes based on geometry will be negatively impacted, since all antenna/parameter corrections/optimizations will be applied to a wrong sector.

Optimization processes based on geo-located inputs will be unreliable, since e.g., samples will be seen located at the back of the expected coverage area of the sector.

LTE carrier aggregation features might not work properly, since Secondary Cell (SCell) planning will be suboptimal if it based on geometry.

Neighbor-cell and PCI (physical cell identifier) planning might not work properly.

To avoid swapped sectors, operators usually define a prevention process to detect misconnections before bringing the sectors on-air. However, this process is not always accurate, for various reasons (e.g., tight deadlines, engineer expertise, etc.), and sometimes swapped sectors are not detected.

Once sectors are on-air, walk and drive testing are the most common solution used by the operators to detect swapped sectors [1]. These methods obtain the signal strength fingerprint of each sector by means of specialized user equipment and analyze them to determine whether the sectors are swapped or not.

Recently, new solutions to detect swapped sectors have been proposed with the aim to avoid walk and drive tests. A first group of these techniques detect swapped sectors based on the network mobility statistics [2] [3] [4] or neighbors plan [5]. These methods estimate the azimuth of each sector depending on: 1) the location of its neighboring sectors, or 2) where the handovers to other sectors are taking place. Later, based on the obtained information, they conclude whether sectors are swapped or not.

Alternatively, [6] proposes a methodology to detect swapped sectors based on interference measurements reported by UEs. The method uses these measurements to determine the strongest non-co-site interferer and then conclude whether it is the expected one or, by contrast, it is a swapped sector.

Although existing solutions have reduced the cost significantly, they still have important drawbacks to overcome:

Prevention processes: these processes are not faultless since they typically rely on an engineer's expertise. Moreover, the rollout activities normally have tight deadlines that lead to inaccurate procedures. As a result, swapped sectors are often not detected.

Walk and drive testing methods [1]: although the accuracy of these methods is very high, the time of execution and the associated costs (i.e. need for equipment, logs processing and reporting . . . ) make them very inefficient.

Methods based on network mobility statistics [2] [3] [4] [5]: even though these techniques allow an important cost reduction, the predictions are still based on inaccurate information, since they used an estimation of the user position when a handover is performed, instead of the real position of the user. Furthermore, the data collection process is still demanding, especially when it must be applied over a big area, due to the large amount of data produced by network mobility statistics at adjacency level.

Method based on interference measurements [6]: this method also allows an important cost reduction compared with walk and drive tests. However, it has two important drawbacks: 1) the stochastic nature of signal strength measurements due to lack of geo-location, and 2) processing the messages that contain signal strength measurements (i.e. call traces) requires a high processing capacity.

Further improvements are needed.

SUMMARY

Described herein are novel methods for detect swapped sectors. According to some embodiments, the methodology is divided into two steps: 1) predict the azimuth of each sector based on its signal strength measurements and the location of these measurements, and 2) use those predicted azimuths to detect swapped sectors.

The first part of these example methods takes as input the signal strength measurements and the antenna physical information (i.e., latitude and longitude) of each sector. Once input data is collected, the method processes the data to calculate a set of features which feed an artificial intelligence model. This model is used to predict the azimuth. Thus, the model requires the antenna physical parameters (i.e. latitude and longitude), that must be provided by the operator, and the geo-located signal strength measurements for each sector. This second input can be collected from different sources: a) crowdsourced data measurement datasets (i.e. data provided by third parties and that it is directly collected from applications installed in the UEs), b) measurements reported by UEs in measurement messages if they are (or can be) geo-located (e.g. MDT CTR traces in 4G), or c) walk and drive tests.

Before using the model to predict, it must be trained in a network where the antenna azimuths are known. Once the model is trained, it can be used to predict the azimuth wherever the method must be applied.

The second part of the method, once an azimuth prediction is calculated for each sector, follows a straightforward algorithm to determine for each case if there are swapped sectors or not.

Accordingly, embodiments of the presently disclosed techniques include a method for detecting swapped antenna sectors in a cellular communications network, where the method comprises, for each of one or more cells in the cellular communications network, estimating an azimuth for each of two or more antenna sectors in the cell using a plurality of geo-located signal measurements for each antenna sector and a machine-learning algorithm. The method further comprises, for each of the one or more cells, comparing the estimated azimuths to azimuths associated with the corresponding antenna sectors in a stored representation of the cellular communications network, to detect swapped antenna sectors in the cell.

The techniques described herein for estimating antenna sector azimuths may be used for other purposes, as well. Thus, other embodiments include a method for estimating antenna sector azimuths in a cellular communications network, where the method comprises obtaining geo-located signal measurements, each of the plurality of geo-located signal measurements comprising a sector identifier, a measurement signal strength, a measurement latitude, and a measurement altitude. The method further comprises, for each of one or more cells in the cellular communications network, estimating an azimuth for each of two or more antenna sectors in the cell using a plurality of geo-located signal measurements for each antenna sector and a machine-learning algorithm.

BRIEF DESCRIPTION OF THE DRAWINGS

FIG. 4 illustrates an example of swapped sectors.

FIG. 5 illustrates example output from a swapped sector detection process.

DETAILED DESCRIPTION

Figure 1:
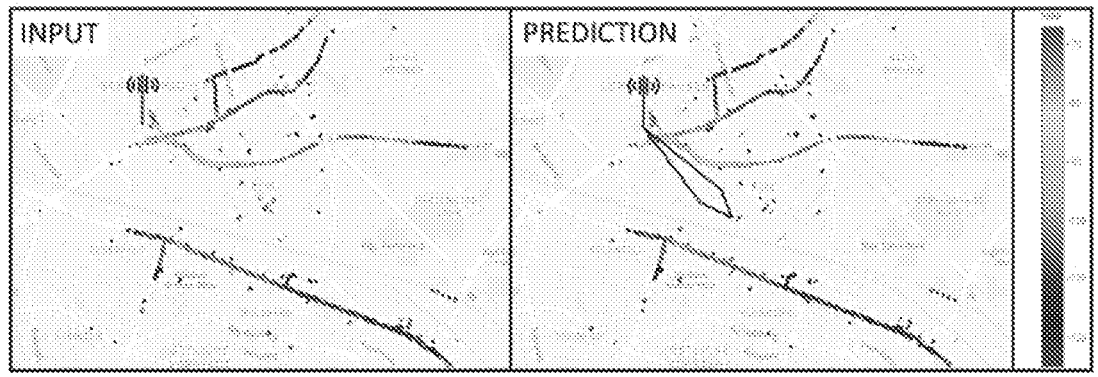
FIG. 1 illustrates antenna sector azimuth estimation based on signal strength measurements.

In this document, the terms "antenna sector" and simply "sector" are used interchangeably, to refer to a sectorized (directional) antenna element in a cell and its associated coverage area. These terms relate to the division of a cell into multiple coverage areas, using antenna elements that are generally co-located but fed separately, so that frequency, time, and/or code resources can be re-used among the sectors. Traditionally, cellular network layouts have been based on dividing the 360-degrees of horizontal coverage from a cell into 60, 90, or 120-degree sectors, but other sector configurations are possible.

The term "azimuth" is used herein largely in its conventional sense, to refer to an angular direction in the local horizontal plane, corresponding to the direction from an origin to a point of interest, e.g., from the location of an antenna to the location of a receiver, or vice-versa, as projected onto a horizontal plane. While azimuths are commonly expressed with reference to north, they can be expressed in any consistent form. As used herein, the term "antenna azimuth" refers to the horizontal direction corresponding to the peak of an antenna's radiation pattern. An antenna installation (e.g., a sectorized antenna installation) can be characterized by the geographic position of the antenna, i.e., its latitude and longitude, and the antenna azimuth and elevation, where the antenna elevation refers to the angle between the maximum of the antenna's radiation pattern and the horizontal plane, as projected onto a vertical plane. The term "measurement azimuth" refers to the direction, in the horizontal plane, from the location of a device performing signal measurements, such as a user equipment (UE) or other wireless device, to the source of the measured signal, such as an antenna sector. Given the geographic location (latitude, longitude) of a measuring UE and the geographic location of a cell from which the measured signals originate, for example, a measurement azimuth can be readily calculated and associated with the measurements provided by the UE. Finally, the term "geo-located measurements" as used herein refers to signal measurements having associated geo-location information indicating the position from which the measurements were taken—this geo-location information, which might be obtained using a satellite positioning system (SPS) or a cellular-based positioning technology, for example, may include latitude and longitude information, and may also include altitude information, in some instances or embodiments.

As discussed above, existing techniques for detecting swapped sectors in a cellular communication system have limitations. Disclosed herein are improved methods for detecting swapped sectors. In various of the presently disclosed embodiments, the methodology is divided in two steps: 1) predict the azimuth of each sector based on its signal strength measurements and the location of these measurements, and 2) use those predicted azimuths to detect swapped sectors.

The first part of this technique takes as input the signal strength measurements and the antenna physical information (i.e. latitude and longitude) of each sector. Once input data is collected, the method processes the data to calculate a set of features which feed an artificial intelligence model, i.e., a machine-learning algorithm, such as a deep neural network (DNN). This model is used to predict the azimuth. Thus, the model requires the antenna physical parameters (i.e. latitude and longitude), that must be provided by the operator, and the geo-located signal strength measurements for each sector. This second input can be collected from different sources: a) crowdsourced data measurement datasets (i.e. data provided by third parties and that it is directly collected from applications installed in the UEs), b) measurements reported by UEs in measurement messages if they are (or can be) geo-located (e.g. MDT CTR traces in 4G), or c) walk and drive tests.

Before using the machine-learning algorithm to predict, it must be trained in a network where the antenna azimuths are known. Once the model is trained, it can be used to predict the azimuth wherever the method must be applied. Therefore, it is recommended to train the model in a network that has different morphologies and a reliable azimuth inventory, after which it need not be retrained in every network where the method is applied.

The second part of the technique, once an azimuth prediction is calculated for each sector, follows a straightforward algorithm to determine for each case if there are swapped sectors or not. In some embodiments, the algorithm is applied in 3 steps:
1. Sectors are grouped by site and carrier.
2. If there are two or more sectors in the group where the absolute difference between the predicted and the real azimuth is higher than a threshold, then the group is selected as candidate of having swapped sectors.
3. For those groups selected as candidates, all possible sector swaps inside the group are tested calculating the error against the azimuth prediction. If the error in one of the swaps is lower than the error obtained with the original setup, then it is concluded that there are swapped sector in that group.

There are several advantages that arise from the presently disclosed techniques:
- The signal strength measurements can be obtained from different sources (e.g. crowdsourced data, UE measurement messages, walk and drive tests . . . ), which makes the algorithm flexible and easy to apply.
- One of the potential sources for signal strength measurements is the crowdsourced data, which is easily accessible for most of the markets in the word without the operator collaboration. Therefore, from the operator point of view, it can detect swapped sectors just providing a small file with the antenna information of its network, which makes the process fast and effortless for the operator.
- The method just needs several measurements per sector (e.g. 50 measurements per sector), which makes possible to manage large geographical areas without a big computational effort.
- Signal strength measurements can be geo-located via GPS which will increase the accuracy of the algorithm compared with the existing solutions.
- The use of artificial intelligence (i.e. Deep Neural Networks), increase the accuracy of the method as compared with the existing solutions
- The method may be used to provide maps as part of the output. These maps show how the signal measurements locations looks compared with the provided azimuth, making the visualization of the swapped sector clear. Thus, these maps, that were not available in the existing solutions, increase the confident of the operators in the method and make easy the validation of the results. Some maps examples are showed in the following sections.
- The methodology can be applied for any vendor or technology.

Summarizing, some of the techniques described herein use an artificial intelligence algorithm that makes use of the antenna physical information and the signal strength measurements of each sector, to first predict the azimuth of each sector, and then to detect potential swapped sectors in the network. Below, these two stages, i.e., azimuth prediction and swap detection, are described in detail.

The first stage may be referred to as "azimuth prediction" or "azimuth estimation"—these terms are used interchangeably herein.

The aim of this stage is to estimate the azimuth of a given sector by using just the latitude, the longitude and the signal strength measurements of that sector. An example is shown in FIG. 1. On the left-hand side are shown the input measurements, mapped to the corresponding geo-located positions of the measuring devices. On the right-hand side, an estimated antenna azimuth for the source antenna sector of the signals is illustrated on the same map.

To estimate the azimuth from the geo-located measurement data, a deep neural network is first trained in a known scenario. The trained model is used to predict the azimuth in different scenarios. Thus, this is a supervised machine-learning problem. The output of this first stage of the algorithm (i.e., azimuth predictions/estimations for each sector) can be used as input to the second stage to detect swapped sectors, but it can also be used separately to any other purpose.

The inputs of the azimuth prediction method presented here are two: 1) the antenna physical information for each sector, and 2) the geo-located signal strength measurements for each sector.

The first input, the antenna physical information, is usually provided by the operator. Typically, this is a lightweight file with some antenna physical information for each sector to be analyzed. Thus, this file contains one row for each sector, with each row including some or all of the following entries:
Sector Id
Site Id
Carrier
Antenna latitude
Antenna longitude
Azimuth In the first stage of the method, the azimuth prediction, only the latitude, the longitude and the azimuth of each sector are required. Moreover, azimuth is only required in the training phase, but not to predict azimuths. The rest of the entries in the list may be used in the second stage of the method, the swapped sectors detection, as discussed below.

The second input, the geo-located signal strength measurements, can be provided by the operator (e.g., in the case of MDT CTR in 4G), but might also be obtained directly from walk and drive tests or provided by third parties crowdsourced data). Typically, this is a heavier file that contains one row per measurement and that may have hundreds of rows per sector. Each row includes at least some of the following information:
Sector Id
Measurement latitude
Measurement longitude
Measurement altitude
Measurement signal strength One of the main strengths of the techniques described, herein is that the inputs are easily accessible and can be obtained from different data sources, making the disclosed methods flexible, fast, and easy to apply.

Geo-located signal strength measurements have been widely used in the past for different purposes and can be collected from measurement messages that UE send to the network, which are available in call traces files and can be geo-located with a number of methods, including triangulation. Moreover, functionalities like MDT (Minimization of Drive Test) allow to geo-localize each measurement. However, the operators are reluctant to activate the collection of these measurements due to the high computational cost and, in some cases, privacy concerns.

These measurements can also be obtained by means of walk and drive tests. Nevertheless, the time of execution and the associated costs make them suitable only for small areas or group of sites.

As an alternative to the existing data sources, crowdsourced data offers geo-located signal strength measurements obtained from applications installed in the UEs. If available, this data source is easily accessible, allowing the obtaining of data for most of the operators and countries in the world in a fast and efficient way, provided that an agreement with the crowdsourced data supplier is in place. Moreover, the access to this data source is carried out without the operator collaboration, which makes the process even easier from the operator point of view. Furthermore, the nature of the end to end process makes the whole methodology independent from the network infrastructure vendor.

Implementations of the presently disclosed techniques have been evaluated making use of crowdsourced data provided by a third party. The techniques are easily adaptable to any other of the mentioned data sources.

Input data is used to calculate features that feed a machine-learning algorithm, such as a DNN (Deep Neural Network). The design of these features, which is addressed when creating the model, is key, since they must synthesize all the available information in the input in a group of features.

In one example of the presented method, a total of 796 features have been defined. Inputs are calculated at sector level and, thus, each row represents one sector for the time window under consideration and is calculated making use only of the samples that belong to the give, sector. Following is the definition of the 796 features:

Signal Strength Azimuth$_{[0,359]}$: These 360 inputs are calculated as the median of the signal strength for all the measurement samples whose azimuth respect to the sector is in the corresponding range$_i$, where range$_i$ is defined as:

$$range_i \rightarrow i \leq azimuth_n < i+1$$

where azimuth$_n$ is the azimuth respect to the sector for a given sample n. Before calculating the median for a given range, the typical distance term of the theoretical propagation losses (i.e. 20·log d) is added for each sample to obviate the impact of the distance in the signal strength and, thus, to take only into account the impact of the azimuth. The definition for these inputs is:

$$Signal\ Strength\ Azimuth_i = median(SS_n + 20\log d_n)$$

where SS$_n$ and d$_n$ are, respectively, the signal strength and the distance to the sector for all the samples n whose azimuth is in range$_i$ Signal Strength Distance$_{[0,75]}$: These 76 inputs are calculated as the median of the signal strength for all the measurement samples whose distance to the sector is in the corresponding range$_i$, where range$_i$ is defined as:
range$_i \rightarrow$ $$10 \cdot i \leq d_n \leq 10 \cdot (i+1)\ for\ i<10$$

$$100+20 \cdot (i-10) \leq d_n \leq 100+20 \cdot (i-9)\ for\ 10 \leq i<30$$

$$500+50 \cdot (i-30) \leq d_n \leq 500+50 \cdot (i-29)\ for\ 30 \leq i<60$$

$$2000+100 \cdot (i-60) \leq d_n \leq 2000+100 \cdot (i-59)\ for\ 60 \leq i \leq 70$$

$$3000+200 \cdot (i-70) \leq d_n \leq 3000+200 \cdot (i-69)\ for\ 120 \leq i \leq 75$$

$$d_n \geq 4000\ for\ i=75$$

where d$_n$ is the distance to the sector for a given sample n.
The definition for these inputs is:

$$Signal\ Strength\ Distance_i = median(SS_n)$$

where SS$_n$ is the signal strength for all the samples n whose distance to the sector is in range$_i$.

Altitude Azimuth$_{[0,359]}$: These 360 inputs are calculated as the median of the altitude for all the measurements samples whose azimuth respect to the sector is in the corresponding range$_i$, where range$_i$ is defined as:

$$range_i \rightarrow i \leq azimuth_n < i+1)$$

where azimuth$_n$ is the azimuth respect to the sector a given sample n.
The definition for these inputs is:

$$Altitude\ Azimuth_i = median(Altitude_n)$$

where Altitude$_n$ is the altitude for all the samples n whose azimuth is in range$_i$.

The results discussed below make use of the ranges defined above. It will be appreciated, however, that other alternative ranges could be used, in other embodiments.

Figure 2:
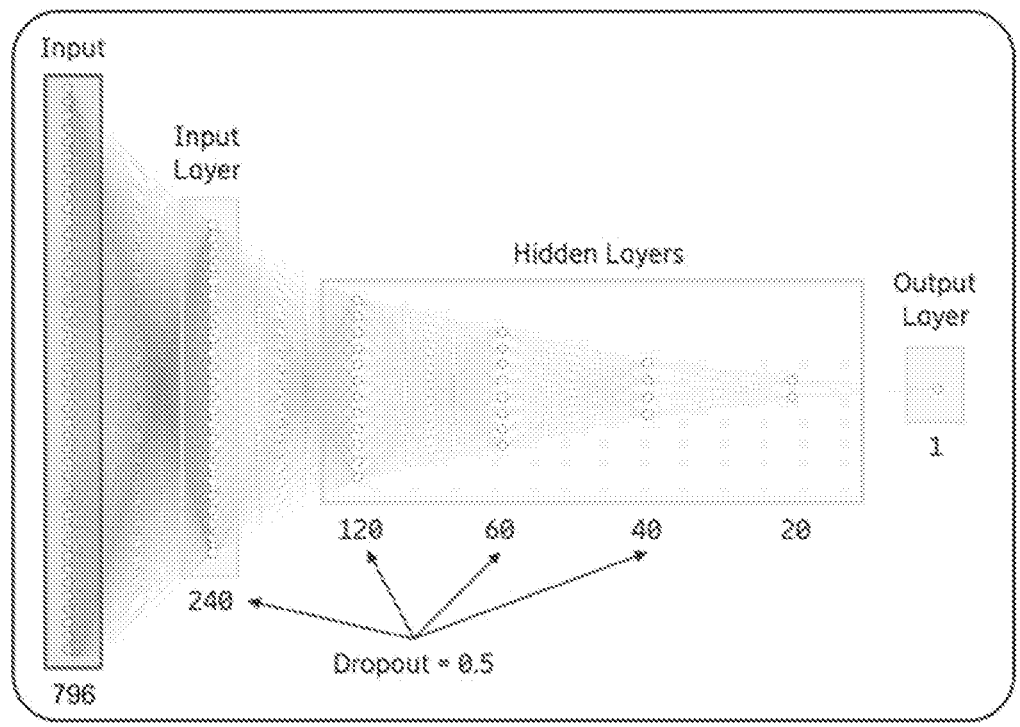
FIG. 2 illustrates an example structure for a deep neural network (DNN).

An example model to solve this supervised learning problem is a DNN having a structure as shown in FIG. 2. The inputs to the model are the features discussed above; the output of the model is the predicted azimuth. During the training phase, the label of the model is the antenna azimuth.

As observed in FIG. 2, the proposed DNN architecture has 4 hidden layers with 120, 60, 40 and 20 neurons respectively, as well as an input layer with 240 neurons and an output layer. This means that the model has 232, 421 trainable parameters. Several dropout layers have been included in the network to avoid overfitting.

Other DNN architectures, or even other machine-learning models, can also be implemented using the same or similar features as input.

Figure 3:
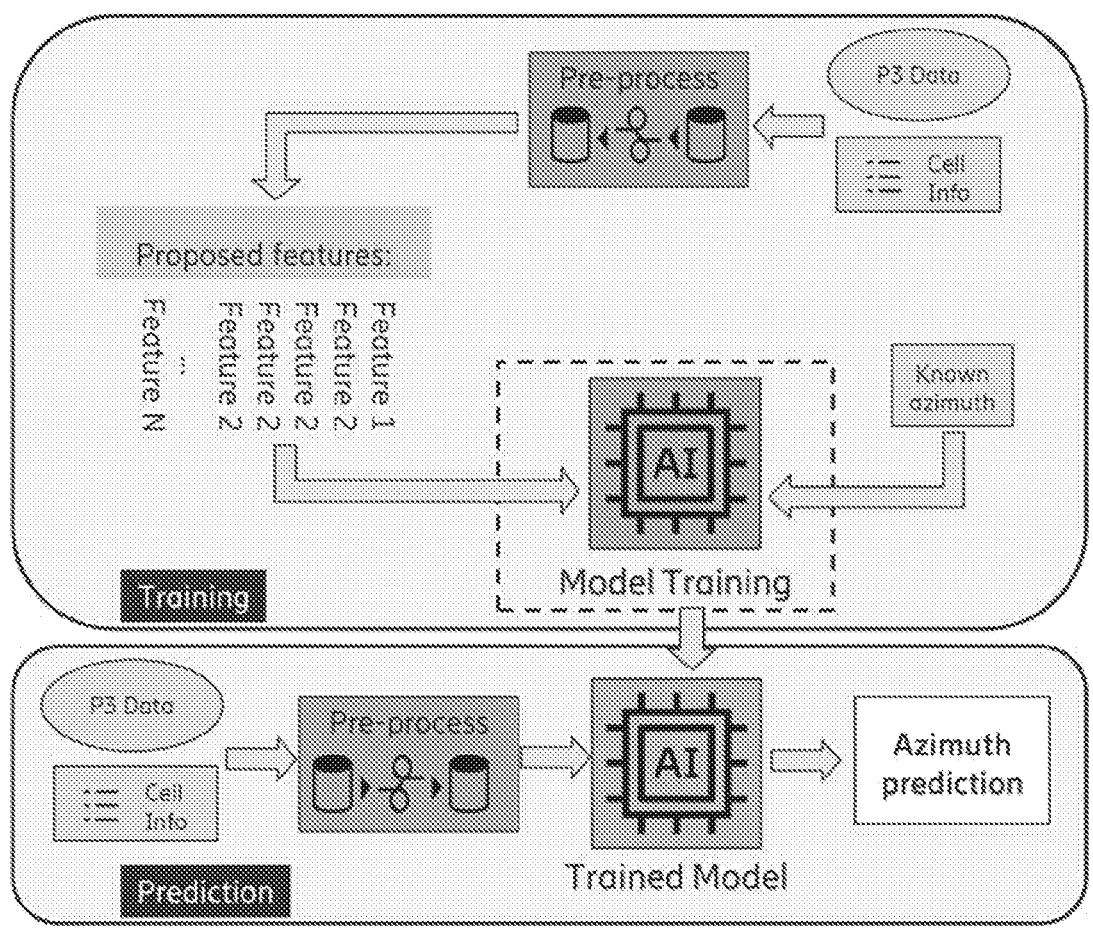
FIG. 3 is a diagram of the machine-learning algorithm training and the prediction process.

FIG. 3 presents the diagram of the training and the prediction process. In the figure, input data is represented by "P3 Data", i.e. geo-located signal strength measurements which are corning from crowdsourced data provided by a third party (P3), and the cell information that is normally provided by the operator. Note that cell information only includes the latitude and the longitude of each sector, since the azimuth is only necessary during the training phase, as showed in the FIG. 3.

In the training phase, the pre-process module takes these inputs to calculate all the features described above. Then, the calculated features and the known azimuth (i.e., the label) of each antenna sector are used to train the proposed model. It is beneficial to train the model in a network that has different morphologies and a reliable azimuth inventory, in order to have a robust model.

Moreover, a randomization process may be applied in the training phase, to avoid that the model fits the azimuth distribution in the network used for training. For this, the azimuth of each sector and its measurements are randomly shifted, to obtain as a result a constant azimuth distribution in the training network.

Finally, in the prediction phase, once the model is trained, the inputs are processed by the pre-process module and the resulting features are used as input of the previously trained model to predict the azimuth of each sector.

The output of the azimuth predictor may be used in a second stage to detect potential swapped sectors. Swapped sectors appear when, during the network rollout phase, feeders from different sectors are crossed. As a result, coverage areas of these sectors are swapped, which means that the azimuth of these sectors are swapped. An example of swapped sectors is showed in FIG. 4, where each sector and its measurements are represented with the same color.

As can be observed in FIG. 4, the green sector should be pointing to the left, the blue sector should be pointing up, and the red sector should be pointing to the right. Thus, from the figure, it can be concluded that exists a circle swap.

The proposed methodology compares the azimuth predicted in the previous stage for each sector with the azimuth stored in the operator network inventory. The term "inventory" is used herein to refer to a stored representation of the cellular communications network, which will include, among other things, information associating antenna sectors for each of a plurality of cells with antenna sector azimuths, based on the network plan/design. Based on these comparisons the algorithm concludes whether sectors feeders are swapped or not. Below, the input, the methodology and the output of the swapped sector detection algorithm are described.

The input data for swapped sectors detection must be provided on a per-sector basis. The most meaningful input is the azimuth prediction obtained in the previous stage, but other sector information is also necessary, and it can be obtained from the antenna physical information data sources described above. Thus, the input file may have one row per sector with the following columns:

Sector Id
Site Id
Carrier
Azimuth, as per the operator inventory (in order to compare this with the data driven predictions and support the identification of swapped sectors)
Predicted Azimuth Additionally, in order to create the map that describes each swapped sector (see FIG. 4), the following data must be available: 1) latitude, longitude and azimuth for each sector, and 2) the geo-located measurement samples for each sector.

Moreover, an optional system setting can be added, stating the minimum number of geo-located measurements per sector in order to issue a diagnosis.

An example methodology to detect swapped sectors can be described in three steps:
1. Sectors are grouped by site and carrier: since swapped sectors involve several sectors, then it is necessary to identify groups of sectors where these swaps can appear; in this case, sectors that belong to the same site and carrier.
2. Azimuth prediction errors higher than a threshold: the algorithm selects only groups where the azimuth prediction error is higher than a given threshold (e.g. 60°, configured as a system setting) in two or more sectors. If the error exceeds the threshold for two or more sectors, then it is likely that these sectors are swapped.

$|Azimuth - Azimuth_{prediction}| >$ Threshold for $N$ cells|$N \geq 2$

3. Find a better permutation: in the groups selected in the previous step, all possible sector-azimuth permutations are evaluated calculating the aggregated azimuth prediction error for each of them. If the aggregated error for one of permutations is lower than the one for the settings in the current network inventory, then it can be assumed that the proposed permutation fits better with the available measurements and, thus, sectors are swapped:

$$\sum_i |Azimuth^i_p - Azimuth^i_{prediction}| <$$

$$\sum_i |Azimuth^i - Azimuth^i_{prediction}| \text{ for any } p$$

where p is any of the possible sector permutations in the selected group, $Azimuth_p^i$ is the azimuth of the sector i in the permutation p, $Azimuth^i$ is the azimuth of sector i as per the operator's inventory, and $Azimuth_{prediction}^i$ is the azimuth prediction of the sector i. If swapped sectors are detected, the permutation with the lower error is the proposed swap.

Figure 6:
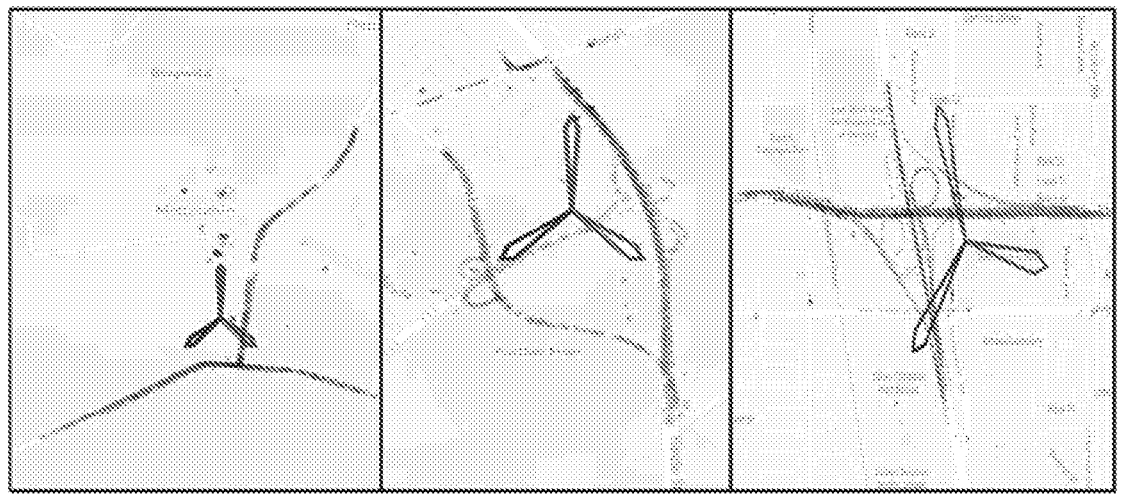
FIG. 6 illustrates an example map output from a swapped sector detection process.

Once potential swapped sectors are detected, several outputs may be delivered. Example outputs are shown in FIG. 5 and FIG. 6.
1. List of pairs site-carrier where swapped sectors are detected (see FIG. 5).
2. Proposed swap, specifying which sectors are involved in the swap and which is the proposed new configuration (see FIG. 5).
3. An indicator of the azimuth prediction error improvement achieved once the sectors are swapped. This indicator can be seen as a measure of the reliability of the detection (see FIG. 5).
4. Maps for swapped sectors visual validation (see FIG. 6).

FIG. 6 shows, from left to right, a green-blue sectors swap and two circle swaps respectively. It is important to highlight the importance of maps for swapped sectors visual validation (output 4) and the indicator of error improvement (output 3). Showing to the user not only the detected swapped sectors, but also an indicator of the reliability of the detection and a map where swapped sectors can be validated visually before visiting the site, the solution increases the user confidence in the algorithm significantly, what has been confirmed in the experiments carried out.

Embodiments of the presently disclosed techniques have already been developed, trained and tested internally in several networks. Results have been positive.

Below, results of an experiment carried out for an operator's network over a whole country with more than 20,000 sectors are described. First, the azimuth predictions are analyzed, and then the output of the swapped sectors detection is described.

The algorithm was trained in an urban and suburban area with 8851 sectors. Inputs as described above were processed to calculate features as described above. These features and the known azimuths have been used to train the model described above. Then, the trained model was tested in a network of a different country with 23,308 sectors, obtaining an azimuth prediction for each of them. The high accuracy of the predictions is exemplified by part (a) of FIG. 7, which presents the real azimuth (horizontal axis) against the predicted azimuth (vertical axis).

Figure 7:
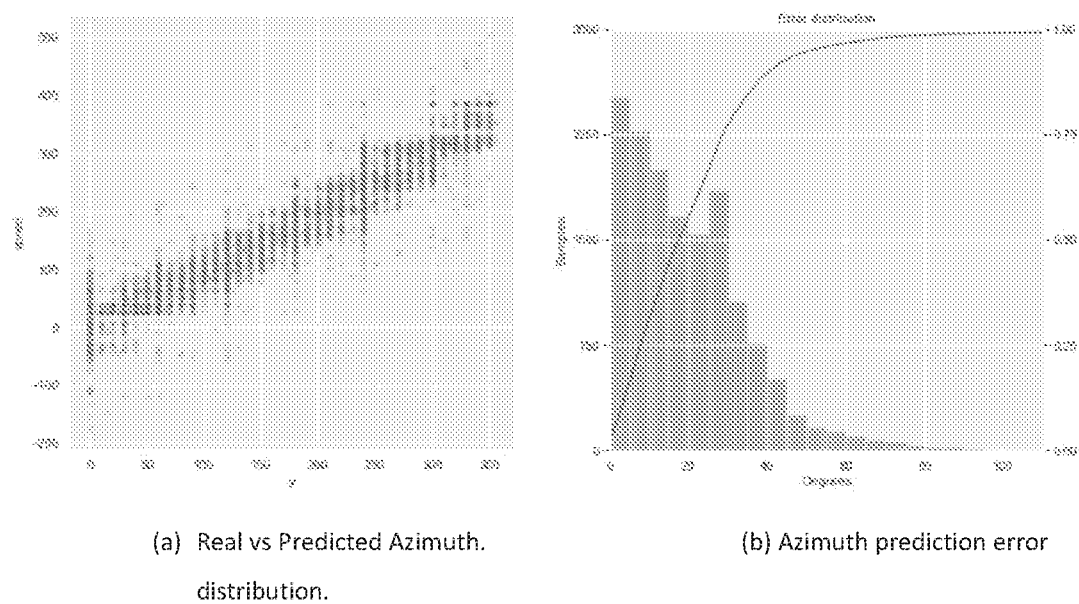
FIG. 7 illustrates performance results for an example implementation of the presently disclosed techniques.

Furthermore, part (b) of FIG. 7 illustrates the predicted azimuth error distribution (left axis) and the cumulative density function (right axis). Results show that the error is lower than 17 degrees for more than 50% of the predictions, and lower than 40 degrees for 90% of the predictions. These errors are low enough to allow the reliable detection of most, if not all, swapped sectors in a network. These results prove the robustness of the technique as well as its accuracy, since the estimation accuracy was tested in a different network of a different country.

Azimuth predictions were further used to test swapped sectors detection method following the methodology described above. As a result, a total of 33 swapped sectors were detected. Moreover, output maps were used to validate each one of these swapped sectors, obtaining 27 (83.4%) positive visual validations (i.e., clearly swapped sectors). The rest of the detections, 6 (15.6%), are categorized as challenging visual validations. Again, results confirm the accuracy and the robustness of the methodology.

The techniques described above provide the following contributions:

- The techniques are based on an innovative process that leverages machine learning and artificial intelligence to first predict azimuths based on signal strength measurements, and then detect swapped sectors based on those predictions.
- The definition of the features described above allows a synthesis of all the information available in the geo-located signal strength measurements to have a very high accuracy in the azimuth prediction.
- The described methodology makes use of the predicted azimuths to detect swapped sectors with a high reliability.
- The inputs defined above can be obtained from different data sources, especially crowdsourced data, which makes the techniques flexible, robust and, from the operator point of view, very easy to apply.
- The randomization process discussed above avoids model overfitting in the case of non-constant azimuth distribution in the network used in the training phase, which is important to obtain a robust model.
- Maps generated as output are deemed very useful. Maps, where swapped sectors can be validated visually before visiting the site, increase the confidence of the user in the algorithm significantly.

Figure 8:
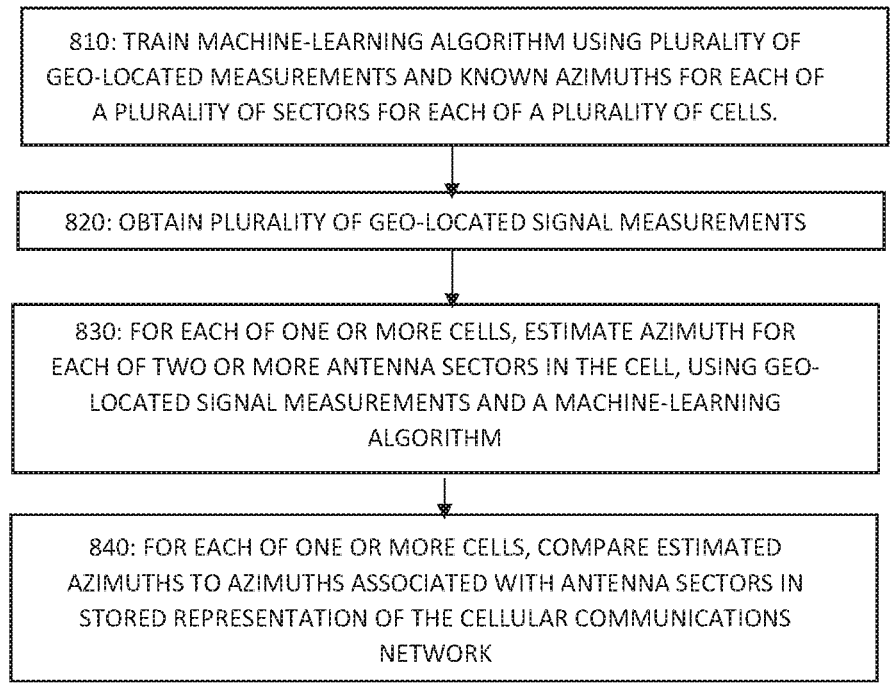
FIG. 8 is a process flow diagram illustrating an example method according to some of the disclosed embodiments.

In view of the detailed discussion above, it should be appreciated that the process flow diagram shown in FIG. 8 illustrates a generalized method for detecting swapped antenna sectors in a cellular communications network, according to some of the techniques described herein. As shown at block 830, the method includes, for each of one or more cells in the cellular communications network, estimating an azimuth for each of two or more antenna sectors in the cell using a plurality of geo-located signal measurements for each antenna sector and a machine-learning algorithm. In some embodiments, the machine-learning algorithm is a deep neural network that has been trained using geo-located signal measurements for one or more cells having antenna sectors with known azimuths. As shown at block 840, the method further comprises, for each of the one or more cells, comparing the estimated azimuths to azimuths associated with the corresponding antenna sectors in a stored representation of the cellular communications network, to detect swapped antenna sectors in the cell.

In some embodiments the method comprises the step of obtaining the plurality of geo-located signal measurements, each of the plurality of geo-located signal measurements comprising a sector identifier, a measurement signal strength, a measurement latitude, and a measurement altitude. This is shown in FIG. 8 at block 820. The geo-located signal measurements may be obtained via a variety of techniques as discussed above. Each of the geo-locates signal measurements may comprise a measurement altitude, in some embodiments.

In some embodiments, estimating the azimuth for each of the antenna sectors comprises calculating, for input into the machine-learning algorithm, a median azimuthal signal strength for each of a plurality of measurement azimuths with respect to a known position of the antenna sector, each median azimuthal signal strength being calculated as the median of all measurement samples for the antenna sector having measurement positions at the respective measurement azimuth, with respect to the antenna sector. In some of these embodiments, determining the median azimuthal signal strength for each of the plurality of measurement azimuths comprises offsetting each measurement corresponding to the measurement azimuth by an amount corresponding to a theoretical propagation loss corresponding to the distance between the respective measurement position and the known position for the antenna sector.

Similarly, in some embodiments, estimating the azimuth for each of the antenna sectors may further comprise calculating, for input into the machine-learning algorithm, a median distance signal strength for each of a plurality of distance ranges, where each median distance signal strength is calculated as the median of the signal strength for all measurement samples for the antenna sector corresponding to a distance between the respective measurement position and the known position for the antenna sector falling with the corresponding distance range. Likewise, in some embodiments, estimating the azimuth for each of the antenna sectors may further comprise calculating, for input into the machine-learning algorithm, a median altitude for each of the plurality of measurement azimuths, where each median altitude is calculated as the median of the altitude for all measurement samples for the antenna sector corresponding to the respective measurement azimuth.

In some embodiments, comparing the estimated azimuths to the azimuths associated with the corresponding antenna sectors to detect swapped antenna sectors comprises identifying antenna sectors for which the estimated azimuths differ from the azimuth associated with the antenna sector by more than a predetermined threshold, the identified antenna sectors indicating antenna sectors for which connections have likely been swapped. In some of these embodiments, comparing the estimated azimuths to the azimuths associated with the corresponding antenna sectors to detect swapped antenna sectors may further comprise, for a cell having two or more identified antenna sectors for which connections have been likely swapped, re-associating antenna sectors with the azimuths in the stored representation of the cellular communications network to determine an association having a lowest aggregated difference between estimated azimuths and stored azimuths for the re-associated antenna sectors, the determined association being a proposed correction for the swapped antenna sectors. In some embodiments, the method may further comprise calculating an azimuth prediction error improvement for the re-associated antenna sectors, the azimuth prediction error improvement indicting a reliability of detection for the detected antenna sector swap.

The embodiments described may be preceded, in some instances and/or embodiments, by the step of training the machine-learning algorithm using a plurality of geo-located measurements and known azimuths for each of a plurality of sectors for each of a plurality of cells. This is shown at block 810 in FIG. 8. In some embodiments, the sectors and cells used to train the machine-learning algorithm are selected to include cells having a variety of different morphologies.

Figure 9:
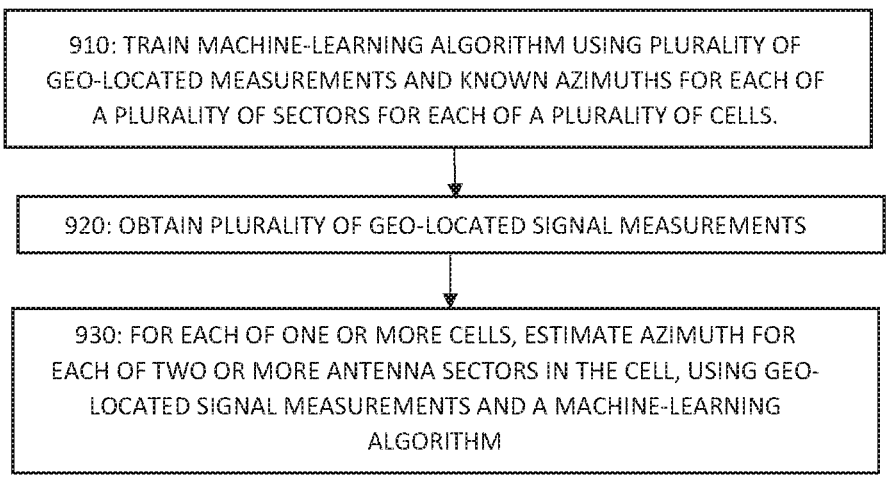
FIG. 9 is a process flow diagram illustrating an example method according to others of the disclosed embodiments.

As noted above antenna sector azimuth estimation is useful more than just detecting swapped antenna sectors. Accordingly, some embodiments of the techniques disclosed herein may omit the step of detecting swapped antenna sectors. FIG. 9 illustrates an example of such an embodiment, showing a method for estimating antenna sector azimuths in a cellular communications network. This method includes the step of obtaining geo-located signal measurements, each of the plurality of geo-located signal measurements comprising a sector identifier, a measurement signal strength, a measurement latitude, and a measurement altitude, as shown in block 920—it should be appreciated that this step corresponds to the step shown at block 820 of FIG. 8. The method illustrated in FIG. 9 further comprises, for each of one or more cells in the cellular communications network, estimating an azimuth for each of two or more antenna sectors in the cell using a plurality of geo-located signal measurements for each antenna sector and a machine-learning algorithm. This is shown at block 930—it will be appreciated that this step corresponds to the step shown at block 830 of FIG. 8. As was the case with the method shown in FIG. 8, the method illustrated in FIG. 9 may include an initial step of training the machine-learning algorithm using a plurality of geo-located measurements and known azimuths for each of a plurality of sectors for each of a plurality of cells. This is shown at block 910 of FIG. 9, which corresponds to block 810 of FIG. 8. All of the variations discussed above with respect to the first three steps of the method shown in FIG. 8 are applicable to the method of FIG. 9, as well.

Figure 10:
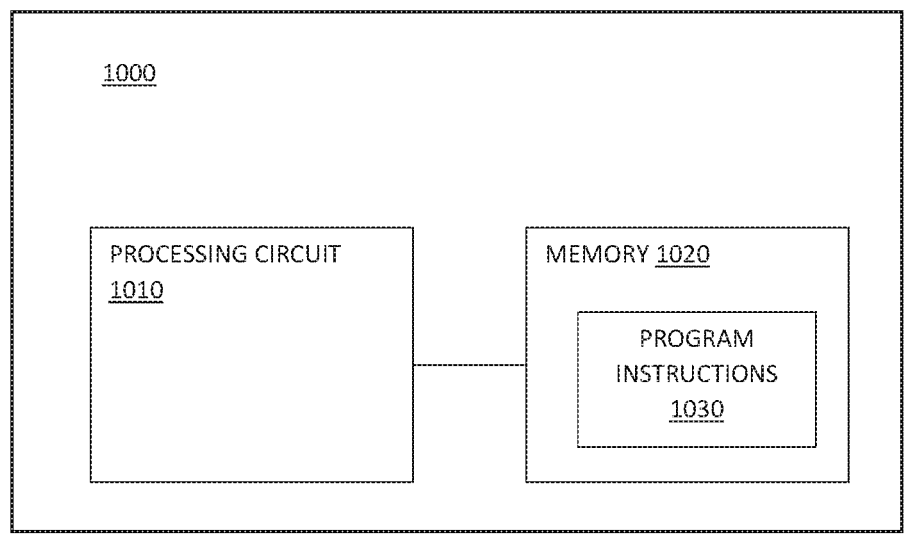
FIG. 10 illustrates an example apparatus according to some embodiments.

FIG. 10 illustrates an example apparatus 1000 for detecting swapped antenna sectors in a cellular communications network, the apparatus 1000 comprising a processing circuit 1010 and a memory 1020 operatively coupled to the processing circuit and comprising program instructions 1030 for execution by the processing circuit 1010. The program instructions 1030 are configured to cause the apparatus 1000 to carry out a method according to any of the techniques described above, including either of the methods illustrated in FIGS. 8 and 9.

Processing circuit 1010 may comprise one or more microprocessors, digital signal processors, and/or specialized digital hardware. Likewise, memory 1020 may comprise one or several physical memory devices, and may include one or a combination of ROM, RAM, Flash memory, etc. Apparatus 1000 may be implemented on a single physical platform, or distributed across multiple platforms, in a "cloud" implementation.

REFERENCES

1. N. Shaikh, Sector Swap Identification Guide, February 2018, [online] Available: www.scribd.com/doc/36864048.
2. O. Kaddoura, R. Barco, I. Serrano, J. J. Sánchez-Sánchez, "Swapped sectors detection based on mobility statistics", IEEE Commun. Lett., vol. 22, pp. 10:38-1041, May 2018.
3. O. Kaddoura, J. J. Sánchez-Sánchez, I. Serrano, R. Barco, "Swapped Sectors Detection on Multi-Layer Networks", IEEE Commun. Lett., vol. 22, no. 11, pp. 2342-2345, November 2018.
4. O. Kaddoura, J. J. Sánchez-Sánchez, I. Serrano, R. Barco, "Swapped Sectors Detection Based on User Location During inter-Site Handovers", IEEE Access, vol. 7, pp. 92547-92560, 2019
5. R. Menon, E. Gormley, "Method and system for crossed antenna feed detection", September 2016.
6. K. Guo, R. Chang, S. Qian, X. Chen, "Method and apparatus for diagnosing feeder misconnection", May 2013

What is claimed is:

1. A method for detecting swapped antenna sectors in a cellular communications network, the method comprising:
   for each of one or more cells in the cellular communications network, estimating an azimuth for each of two or more antenna sectors in the cell using a plurality of geo-located signal measurements for each antenna sector and a machine-learning algorithm, wherein the machine-learning algorithm is a deep neural network that has been trained using geo-located signal measurements for one or more cells having antenna sectors with known azimuths; and
   for each of the one or more cells, comparing the estimated azimuths to azimuths associated with the corresponding antenna sectors in a stored representation of the cellular communications network, to detect swapped antenna sectors in the cell.

2. The method of claim 1, further comprising:
   obtaining the plurality of geo-located signal measurements, each of the plurality of geo-located signal measurements comprising a sector identifier, a measurement signal strength, a measurement latitude, and a measurement altitude.

3. The method of claim 2, wherein each of the plurality of geo-located signal measurements further comprises a measurement altitude.

4. The method of claim 1, wherein estimating the azimuth for each of the antenna sectors comprises calculating, for input into the machine-learning algorithm, a median azimuthal signal strength for each of a plurality of measurement azimuths with respect to a known position of the antenna sector, each median azimuthal signal strength being calculated as the median of all measurement samples for the antenna sector having measurement positions at the respective measurement azimuth, with respect to the antenna sector.

5. The method of claim 4, wherein determining the median azimuthal signal strength for each of the plurality of measurement azimuths comprises offsetting each measurement corresponding to the measurement azimuth by an amount corresponding to a theoretical propagation loss corresponding to the distance between the respective measurement position and the known position for the antenna sector.

6. The method of claim 4, wherein estimating the azimuth for each of the antenna sectors further comprises calculating, for input into the machine-learning algorithm, a median distance signal strength for each of a plurality of distance ranges, each median distance signal strength being calculated as the median of the signal strength for all measurement samples for the antenna sector corresponding to a distance between the respective measurement position and the known position for the antenna sector falling with the corresponding distance range.

7. The method of claim 4, wherein estimating the azimuth for each of the antenna sectors further comprises calculating, for input into the machine-learning algorithm, a median altitude for each of the plurality of measurement azimuths, each median altitude being calculated as the median of the altitude for all measurement samples for the antenna sector corresponding to the respective measurement azimuth.

8. The method of claim 1, wherein comparing the estimated azimuths to the azimuths associated with the corresponding antenna sectors to detect swapped antenna sectors comprises identifying antenna sectors for which the estimated azimuths differ from the azimuth associated with the antenna sector by more than a predetermined threshold, the identified antenna sectors indicating antenna sectors for which connections have likely been swapped.

9. The method of claim 8, wherein comparing the estimated azimuths to the azimuths associated with the corresponding antenna sectors to detect swapped antenna sectors further comprises, for a cell having two or more identified antenna sectors for which connections have been likely swapped, re-associating antenna sectors with the azimuths in the stored representation of the cellular communications network to determine an association having a lowest aggregated difference between estimated azimuths and stored azimuths for the re-associated antenna sectors, the determined association being a proposed correction for the swapped antenna sectors.

10. The method of claim 9, further comprising calculating an azimuth prediction error improvement for the re-associated antenna sectors, the azimuth prediction error improvement indicting a reliability of detection for the detected antenna sector swap.

11. The method of claim 1, further comprising, prior to said estimating azimuths and comparing estimated azimuths, training the machine-learning algorithm using a plurality of geo-located measurements and known azimuths for each of a plurality of sectors for each of a plurality of cells.

12. A method for estimating antenna sector azimuths in a cellular communications network, the method comprising:
obtaining geo-located signal measurements, each of the plurality of geo-located signal measurements comprising a sector identifier, a measurement signal strength, a measurement latitude, and a measurement altitude; and
for each of one or more cells in the cellular communications network, estimating an azimuth for each of two or more antenna sectors in the cell using a plurality of geo-located signal measurements for each antenna sector and a machine-learning algorithm, wherein the machine-learning algorithm is a deep neural network that has been trained using geo-located signal measurements for one or more cells having antenna sectors with known azimuths.

13. The method of claim 12, further comprising:
obtaining the plurality of geo-located signal measurements, each of the plurality of geo-located signal measurements comprising a sector identifier, a measurement signal strength, a measurement latitude, and a measurement altitude.

14. The method of claim 12, wherein estimating the azimuth for each of the antenna sectors comprises calculating, for input into the machine-learning algorithm, a median azimuthal signal strength for each of a plurality of measurement azimuths with respect to a known position of the antenna sector, each median azimuthal signal strength being calculated as the median of all measurement samples for the antenna sector having measurement positions at the respective measurement azimuth, with respect to the antenna sector.

15. The method of claim 14, wherein determining the median azimuthal signal strength for each of the plurality of measurement azimuths comprises offsetting each measurement corresponding to the measurement azimuth by an amount corresponding to a theoretical propagation loss corresponding to the distance between the respective measurement position and the known position for the antenna sector.

16. The method of claim 14, wherein estimating the azimuth for each of the antenna sectors further comprises calculating, for input into the machine-learning algorithm, a median distance signal strength for each of a plurality of distance ranges, each median distance signal strength being calculated as the median of the signal strength for all measurement samples for the antenna sector corresponding to a distance between the respective measurement position and the known position for the antenna sector falling with the corresponding distance range.

17. The method of claim 14, wherein estimating the azimuth for each of the antenna sectors further comprises calculating, for input into the machine-learning algorithm, a median altitude for each of the plurality of measurement azimuths, each median altitude being calculated as the median of the altitude for all measurement samples for the antenna sector corresponding to the respective measurement azimuth.

18. The method of claim 12, further comprising, prior to said estimating azimuths, training the machine-learning algorithm using a plurality of geo-located measurements and known azimuths for each of a plurality of sectors for each of a plurality of cells.

19. An apparatus for detecting swapped antenna sectors in a cellular communications network, the apparatus comprising:
a processing circuit, and
a memory operatively coupled to the processing circuit and comprising program instructions for execution by the processing circuit, wherein the program instructions are configured to cause the apparatus to:
for each of one or more cells in the cellular communications network, estimate an azimuth for each of two or more antenna sectors in the cell using a plurality of geo-located signal measurements for each antenna sector and a machine-learning algorithm, wherein the machine-learning algorithm is a deep neural network that has been trained using geo-located signal measurements for one or more cells having antenna sectors with known azimuths; and
for each of the one or more cells, compare the estimated azimuths to azimuths associated with the corresponding antenna sectors in a stored representation of the cellular communications network, to detect swapped antenna sectors in the cell.

* * * * *